US010264738B2

(12) United States Patent
Ward

(10) Patent No.: US 10,264,738 B2
(45) Date of Patent: Apr. 23, 2019

(54) CONFORMAL TREE STAKING APPARATUS

(71) Applicant: Justin Dart Ward, Fenton, MI (US)

(72) Inventor: Justin Dart Ward, Fenton, MI (US)

( * ) Notice: Subject to any disclaimer, the term of this patent is extended or adjusted under 35 U.S.C. 154(b) by 59 days.

(21) Appl. No.: 14/523,874

(22) Filed: Oct. 25, 2014

(65) Prior Publication Data

US 2016/0113216 A1   Apr. 28, 2016

(51) Int. Cl.
*A01G 17/00* (2006.01)
*A01G 17/12* (2006.01)

(52) U.S. Cl.
CPC .................... *A01G 17/12* (2013.01)

(58) Field of Classification Search
CPC .......... A01G 7/00; A01G 17/14; A01G 17/04; A01G 9/12; A01G 9/122; A01G 9/124; A47G 33/12
USPC ..................................... 47/40.5, 42
See application file for complete search history.

(56) References Cited

U.S. PATENT DOCUMENTS

| | | | | |
|---|---|---|---|---|
| 2,501,255 A | * | 3/1950 | Bell | A01G 17/04 248/511 |
| 4,008,669 A | * | 2/1977 | Sumrell | B60P 7/12 105/422 |
| 4,249,342 A | * | 2/1981 | Williams | A01G 9/12 47/43 |
| 4,318,246 A | | 3/1982 | Jungbluth et al. | |
| 4,480,403 A | * | 11/1984 | Williams | F16M 13/00 47/42 |
| 5,199,677 A | | 4/1993 | Sessions | |
| 5,402,600 A | * | 4/1995 | Tompkins | A01G 17/12 47/42 |
| 5,568,700 A | | 10/1996 | Veneziano et al. | |
| 5,950,359 A | | 9/1999 | Pivnik | |
| 6,032,408 A | * | 3/2000 | Nielsen | A01G 17/04 47/42 |
| 6,363,655 B1 | * | 4/2002 | Napolitano | A01G 9/12 47/42 |
| 6,708,446 B2 | | 3/2004 | Ambrose | |
| 6,833,097 B2 | * | 12/2004 | Miyachi | B29C 43/003 264/118 |
| 6,964,126 B1 | | 11/2005 | Anderson | |
| 7,661,224 B1 | * | 2/2010 | Poyas | A01G 9/12 248/218.4 |
| 8,132,361 B1 | | 3/2012 | Poyas | |
| 2005/0274070 A1 | * | 12/2005 | Steadman | A01G 17/04 47/44 |

(Continued)

FOREIGN PATENT DOCUMENTS

| | | | | |
|---|---|---|---|---|
| FR | 1105561 A | * | 12/1955 | ............ A01G 17/04 |
| WO | WO 2012129607 A1 | * | 10/2012 | ......... E04H 12/2292 |

OTHER PUBLICATIONS

Patent Translation, Cimetiere (FR 1105561 A).*
Deeproot, "Arbor Tie Brochure" (http://www.deeproot.com/resources/arbortie/arbortie_brochure.pdf).

*Primary Examiner* — Monica L Williams
*Assistant Examiner* — Aaron M Rodziwicz
(74) *Attorney, Agent, or Firm* — Burris Law, PLLC

(57) ABSTRACT

An apparatus for staking a tree is provided that includes a rigid body defining an outer surface, an inner surface, and opposed guides, the inner surface having a conformal curvature and the opposed guides being disposed along a longitudinal periphery of the rigid body, wherein the conformal curvature is sized to conform to an outer profile geometry of the tree.

19 Claims, 6 Drawing Sheets

(56) References Cited

U.S. PATENT DOCUMENTS

2008/0092439 A1    4/2008   Banks

* cited by examiner

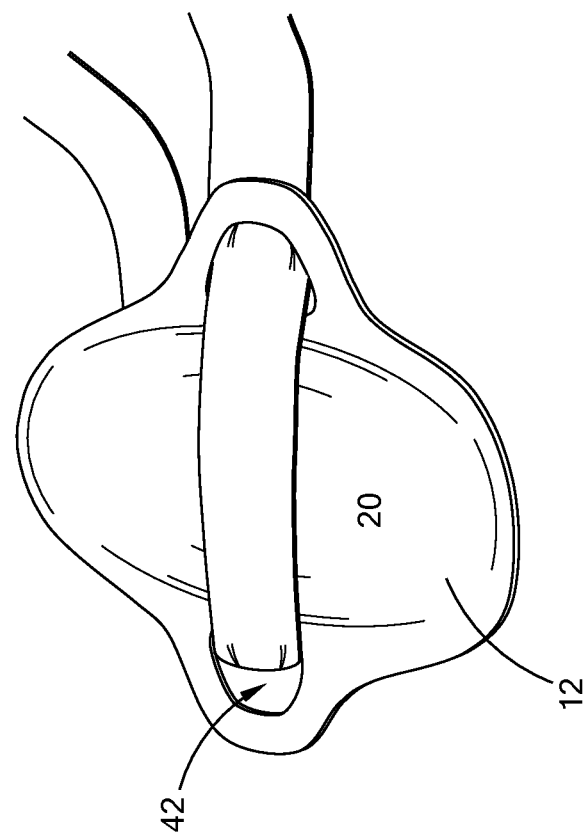
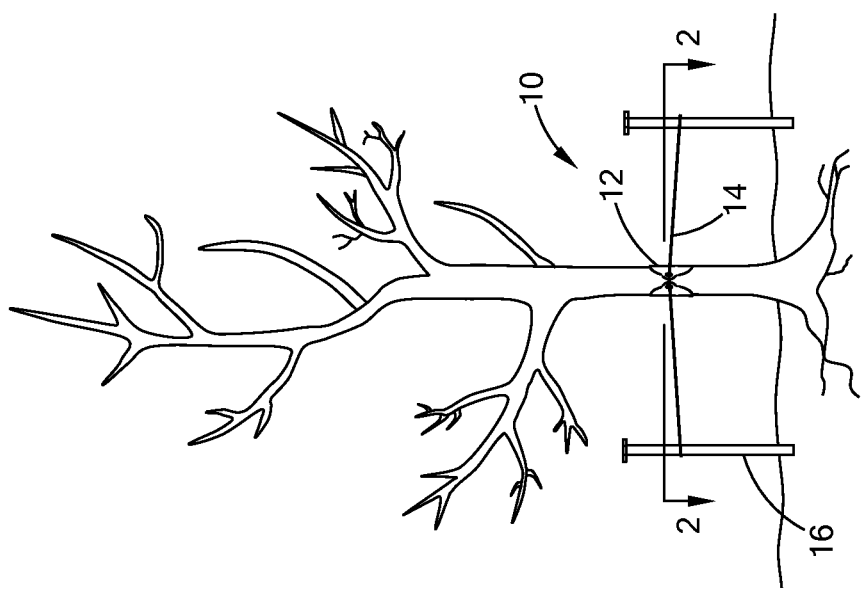
FIG. 1B
FIG. 1A

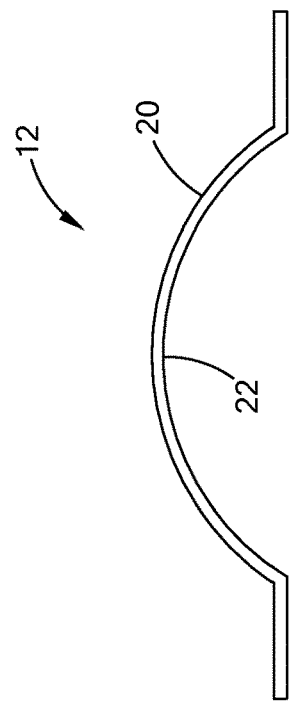
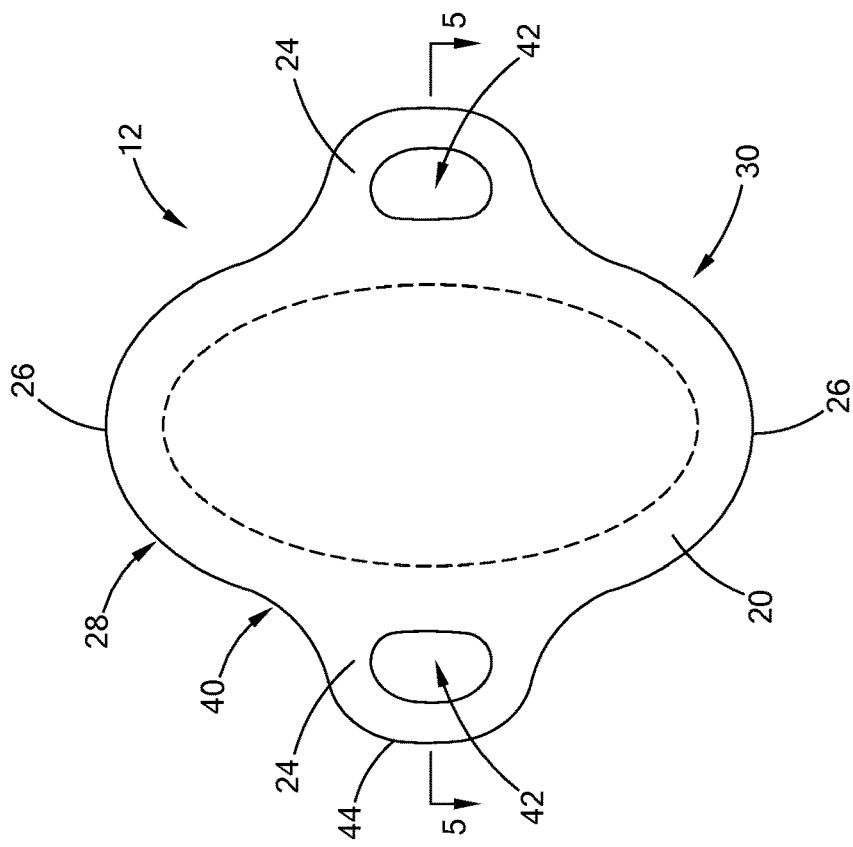

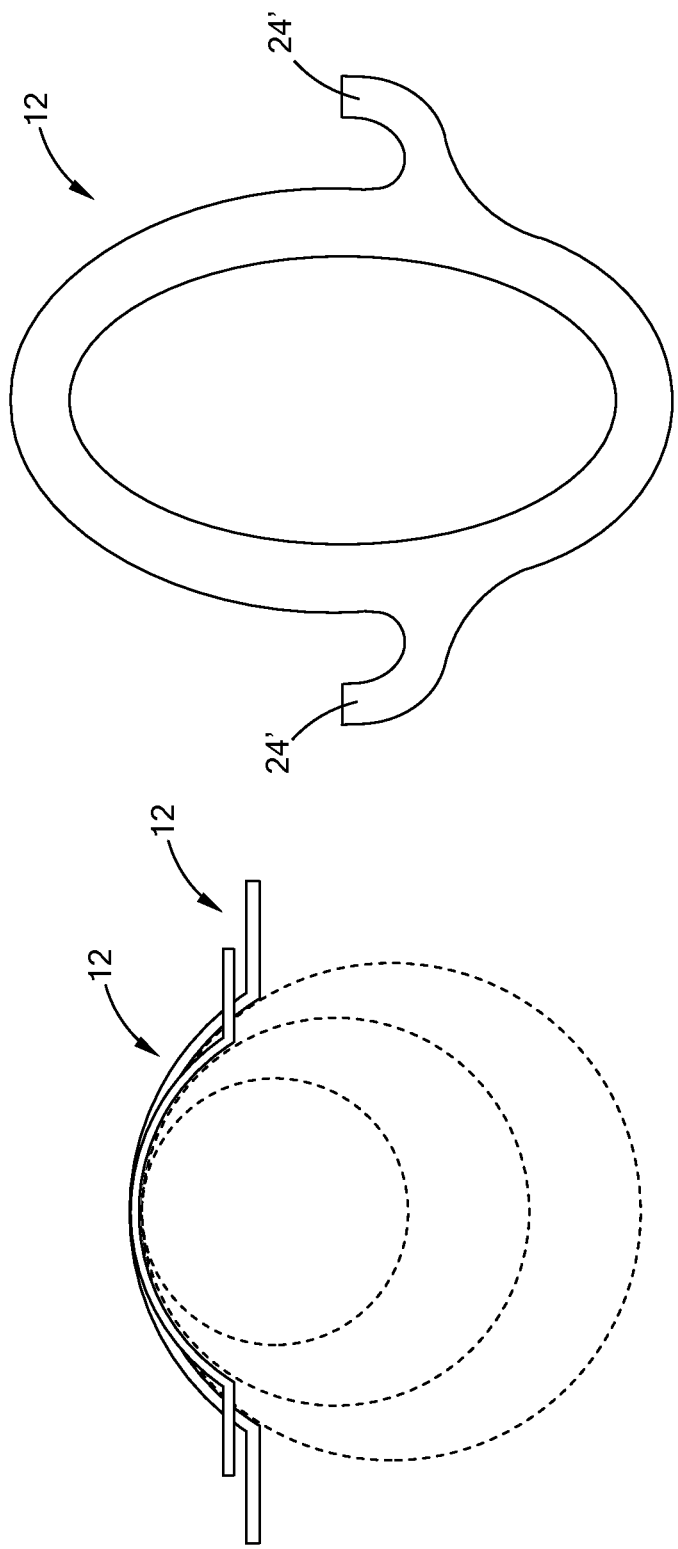

US 10,264,738 B2

CONFORMAL TREE STAKING APPARATUS

FIELD

The present disclosure relates to tree husbandry and devices for supporting or stabilizing trees during initial growth or trees that are exposed to harsh environmental conditions.

BACKGROUND

The statements in this section merely provide background information related to the present disclosure and may not constitute prior art.

Trees that are young or transplanted are often supported by staking devices in order to ensure proper growth such that the tree does not lean or fall over time. For example, excessive wind can cause growth abnormalities, and poor soil conditions can cause a tree to lean. Known staking devices typically consist of ropes or wires that are wrapped around the tree and staked into the ground. However, these staking devices have a tendency to cut into the trunk of a tree over time if they are not adjusted when the tree grows. This can result in choking or bulbing of the tree trunk, which causes weakness in the trunk and eventual catastrophic damage to the tree. Some staking devices incorporate a rubber gasket or portion of a garden hose around a guy wire and against the tree trunk in order to reduce such cutting. This method, unfortunately, also results in damage to the tree if adjustments are not made over time.

Additional staking devices incorporate multiple posts and elaborate bracing systems in order to avoid damaging the tree as it grows. These devices are time-consuming and difficult to install and are often cost prohibitive. Due to the increased difficulty of installation, these more elaborate bracing systems are often installed incorrectly, thus resulting in damage to the tree over time as well.

SUMMARY

In one form, an apparatus for staking a tree is provided that comprises a rigid body defining an outer surface, an inner surface, and opposed guides, the inner surface having a conformal curvature and the opposed guides being disposed along a longitudinal periphery of the rigid body, wherein the conformal curvature is sized to conform to an outer profile geometry of the tree.

In another form, an apparatus for staking a tree is provided that comprises a rigid body defining an outer surface, an inner surface, and opposed guides, the inner surface having a conformal curvature and the opposed guides being disposed along a longitudinal periphery of the rigid body, wherein the conformal curvature is sized to conform to an outer profile geometry of the tree. The apparatus further comprises at least one tie-down, the tie-down extending through the guides and around the outer surface of the rigid body and at least one stake, wherein the tie-down is secured to the stake, and the stake is configured to be secured to a grounding surface for the tree.

In still another form, a tree-staking kit is provided that comprises a plurality of rigid bodies, each rigid body defining an outer surface, an inner surface, and opposed guides, the inner surface having a conformal curvature and the outer surface having a conformal curvature radially offset from the conformal curvature of the inner surface, and the opposed guides being disposed along longitudinal peripheries of the rigid bodies, wherein the conformal curvature of the inner surfaces are sized to conform to an outer profile geometry of a tree. A plurality of tie-downs are also provided, each tie-down configured to extend through the opposed guides and around the outer surface of the rigid body. The kit further comprises a plurality of stakes, wherein the tie-downs are configured to be secured to the stakes, and the stakes are configured to be secured to a grounding surface for the tree.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1A is a side view of a deciduous tree having the conformal tree staking apparatus installed therein and constructed in accordance with the teachings of the present disclosure;

FIG. 1B is a enlarged partial perspective view of the conformal tree staking apparatus of FIG. 1A in accordance with the teachings of the present disclosure;

FIG. 4 is a plan view of the rigid body of FIG. 3;

FIG. 5 is a cross-sectional view of the rigid body, taken along line 5-5 of FIG. 4;

FIG. 6 is a cross-sectional view of a variety of rigid bodies illustrating different caliper trees being accommodated by the conformal curvatures of the rigid bodies in accordance with the teachings of the present disclosure;

Figure 8:
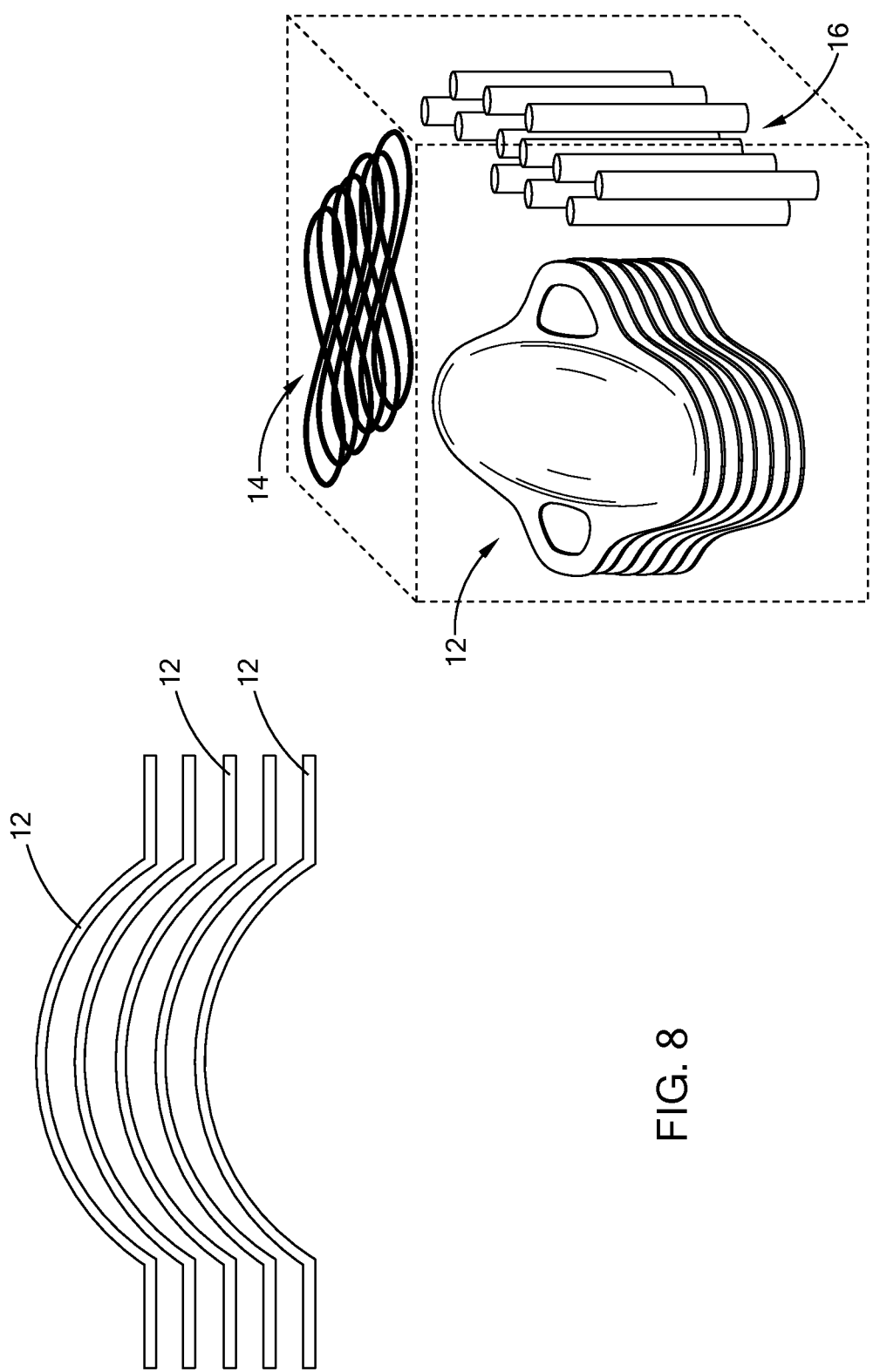

FIG. 7 is a partial side view of a rigid body having different opposed guides and constructed in accordance with the teachings of the present disclosure; and FIG. 8 is a side view of a plurality of rigid bodies being stacked in accordance with the teachings of the present disclosure, along with a plurality of tie-downs and stakes arranged in a kit in accordance with another form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1D:
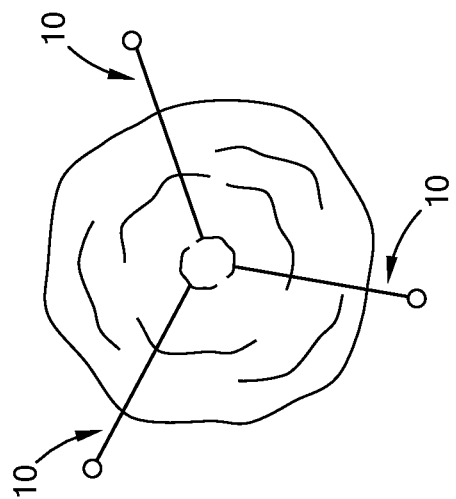
FIG. 1D is a plan view of the evergreen tree and conformal tree staking apparatus of FIG. 1B.
Figure 1C:
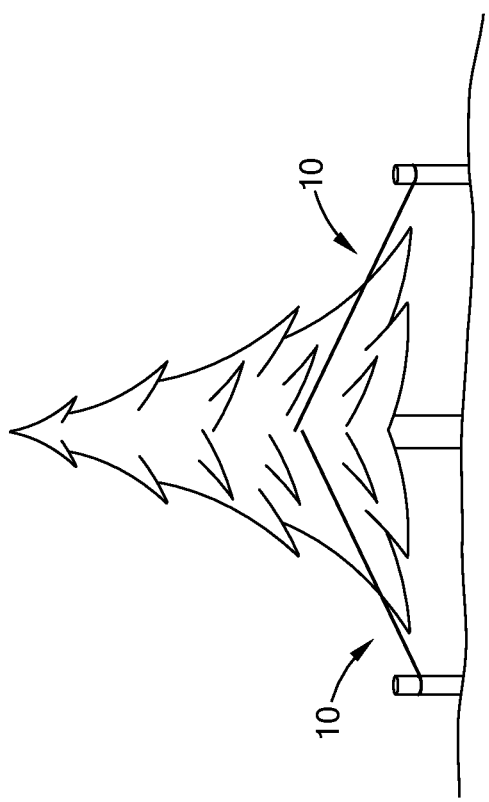
FIG. 1C is a side view of an evergreen tree having the conformal tree staking apparatus installed therein and constructed in accordance with the teachings of the present disclosure.
Figure 2:
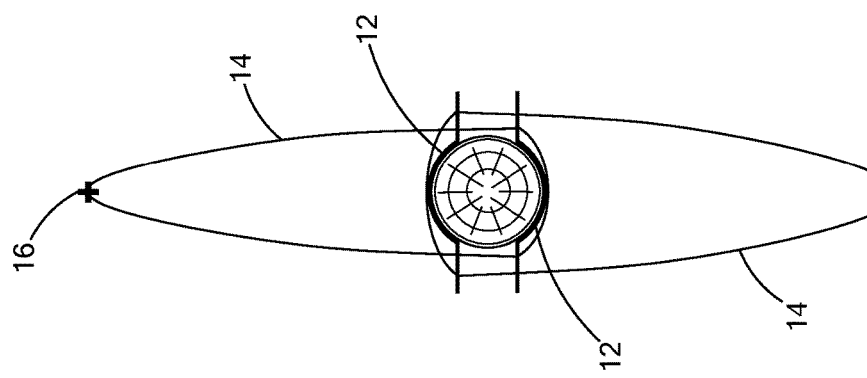
FIG. 2 is a cross-sectional view of the tree and staking apparatus taken along line 2-2 of FIG. 1A and constructed in accordance with the teachings of the present disclosure.

Referring to FIGS. 1-2, an apparatus for staking a tree is generally illustrated and indicated by reference numeral 10.

In one form, the apparatus 10 comprises a rigid body 12, a tie-down 14, and stakes 16. Either one or a plurality of apparatuses 10 may be used with the tree, depending on how much support the tree may need given its age, condition, environmental conditions, and soil quality, among other considerations. As shown, the tie-down 14, which in one form is an ArborTie® brand woven polyester material, is secured to the stakes 16, and the stakes 16 are placed into the ground, or a grounding surface 18, in order to properly support the tree.

The tree staking apparatus 10 may employed in a variety of configurations other than that shown with the deciduous tree in FIG. 1A. For example, a configuration with an evergreen tree is illustrated in FIGS. 1C and 1D, where three (3) tree staking apparatuses 10 are employed. Accordingly, any number and configuration of tree staking apparatuses 10 may be used while remaining within the scope of the present disclosure.

Figure 3:
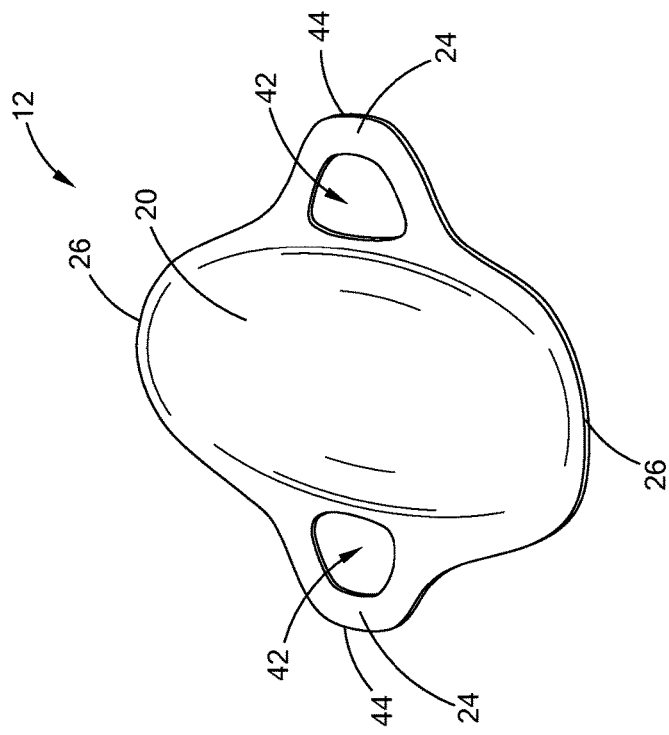
FIG. 3 is a perspective view of one form of a rigid body constructed in accordance with the teachings of the present disclosure.

As further shown in FIGS. 3-5, the rigid body 12 defines an outer surface 20, an inner surface 22, and opposed guides 24. The inner surface 22 defines a conformal curvature that is sized to conform to an outer profile geometry of the tree. For example, the inner surface 22 as shown defines an arcuate shape and may be provided in a number of diameters. As shown in FIG. 6, such diameters may include, by way of example, a 2-3 caliper, a 3-4 caliper, or a 4-5 caliper tree size, among other calipers. FIG. 4 illustrates dimensions for one form of the rigid body 12. It should be understood that these dimensions are only exemplary and should not be construed as limiting the scope of the present disclosure. It is also contemplated that the conformal curvature be custom designed for a tree that may not have a standard, or typical circular trunk.

The rigid body 12 also defines rounded edges 26 extending around its upper and lower portions 28, 30. These rounded edges 26 generally provide for an improved or smooth interface between the rigid body 12 and the tree, by not having any sharp or abrupt corners that may dig into the tree over time as the tree grows. The rounded edged 26 also facilitate ease of handling by an installer.

The rigid body 12 in one form is a steel material with an optional elastomeric overcoat. Alternately, the rigid body 12 could be a plastic material, such as a thermoset or thermoplastic material that is capable of withstanding specific environmental conditions that the tree may encounter. In another form, which is particularly useful when the tree does not see regular attention or maintenance, the material of the rigid body 12 is biodegradable, which in one form may be a biodegradable plastic.

The rigid body 12 may also include a predetermined functional pattern (not shown) disposed on at least a portion of its outer surface 20, such as by way of example, product branding/marking (e.g., trademarks), colors, textures, or combinations thereof.

As further shown, the opposed guides 24 are disposed along a longitudinal periphery 40 of the rigid body 12 and are opposed by 180° in this form of the present disclosure. Although two opposed guides 24 are shown, it should be understood that any number and configuration of guides 24 may be employed while remaining within the scope of the present disclosure. The opposed guides 24 define apertures 42, through which the tie-down 14 is inserted, which is better shown in FIG. 1B. In this installation, the tie-down 14 is wrapped around the outer surface 20 of the rigid body 12, which provides a bearing surface for the tie-down 14, and thus the inner surface 22 of the rigid body 12 provides an increased surface area for improved engagement of the tree.

In one form, the opposed guides 24 define rounded outer edges 44 in order to improve handling and engagement of the tree. While the opposed guides 24 define a semi-circular geometry as shown, it should be understood that any number of geometries or configurations may be employed while remaining within the scope of the present disclosure. For example, as shown in FIG. 7, the opposed guides 24' in another form define an open shape, rather than the closed semi-circular geometry as previously shown. In this form, the tie-down 14 may be easier to install without having to be threaded through an opening and then around the rigid body 12.

Referring back to FIG. 5, the outer surface 20 of the rigid body 12 has a conformal curvature radially offset from the conformal curvature of the inner surface 22. It should be understood, however, that the outer surface 20 may define another profile rather than being radially offset from the inner surface 22 while remaining within the scope of the present disclosure.

Referring now to FIG. 8, the tree staking apparatus 10 may be provided in a set, or a kit, with a plurality of rigid bodies 12 that are stackable due to the conformal curvatures of the inner and outer surfaces 22, 20. Such a configuration provides for ease of storage and shipping. Accordingly, the plurality of rigid bodies 12 may also be packaged in a kit with a plurality of tie-downs 14 and a plurality of stakes 16 according to the teachings of the present disclosure.

According to the principles of the present disclosure, the rigid body 12 thus distributes forces across a greater surface area (the inner surface 22 bearing against the tree) to provide improved support to the tree. The present disclosure is advantageous because it prevents a guy wire or tie-down, or other smaller support device, from growing into and damaging the tree during growth.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for staking a tree comprising:
   a rigid body defining an outer surface, an inner surface, and two opposed guides defining apertures, the rigid body defining an oval shape and the two opposed guides protruding outwardly from a longitudinal periphery of the rigid body and being opposed by 180°, wherein a tie-down extends through one of the two opposed guides, across and bears against the outer surface, and through the other opposed guide, the inner surface having a conformal curvature and the opposed guides being disposed along a longitudinal periphery of the rigid body, and the outer surface of the rigid body having a conformal curvature radially offset from the conformal curvature of the inner surface, wherein the conformal curvature of the inner surface is sized to conform to an outer profile geometry of the tree and the rigid body partially encircles the tree when installed.

2. The apparatus according to claim 1, wherein the apertures define rounded outer edges.

3. The apparatus according to claim 1, wherein the apertures define a semi-circle geometry.

4. The apparatus according to claim 1 further comprising:
   at least one tie-down, the tie down extending through the guides and around the outer surface of the rigid body; and
   at least one stake, wherein the tie-down is secured to the stake, and the stake is configured to be secured to a grounding surface for the tree.

5. The apparatus according to claim 1, further comprising a plurality of rigid bodies that are stackable due to the conformal curvatures of the inner and outer surfaces.

6. The apparatus according to claim 1, wherein the rigid body defines upper and lower portions and rounded edges extending around the upper and lower portions.

7. The apparatus according to claim 1, wherein the rigid body defines a steel material having an elastomeric overcoat.

8. The apparatus according to claim 1, wherein the rigid body defines a plastic material selected from the group consisting of a thermoplastic and a thermoset.

9. The apparatus according to claim 1, wherein the rigid body defines a biodegradable plastic material.

10. The apparatus according to claim 1, wherein the conformal curvature defines a diameter selected from the group consisting of a 2-3 caliper, a 3-4 caliper, and a 4-5 caliper tree size.

11. The apparatus according to claim 1, wherein the rigid body defines a predetermined functional pattern disposed on at least a portion of the outer surface.

12. An apparatus for staking a tree comprising:
a rigid body defining an outer surface, an inner surface, and two opposed guides defining apertures, the inner surface having a conformal curvature and the opposed guides being disposed along a longitudinal periphery of the rigid body, the rigid body defining an oval shape and the two opposed guides protruding outwardly from the longitudinal periphery of the rigid body and being opposed by 180°, and the outer surface of the rigid body having a conformal curvature radially offset from the conformal curvature of the inner surface, wherein the conformal curvature of the inner surface is sized to conform to an outer profile geometry of the tree and the rigid body partially encircles the tree when installed;
a tie-down, the tie-down extending through one of the apertures of the two opposed guides, across and bearing against the outer surface, and through the other aperture of the opposed guide; and
at least one stake,
wherein the tie-down is secured to the stake, and the stake is configured to be secured to a grounding surface for the tree.

13. The apparatus according to claim 12 further comprising two stakes, wherein one end of the tie-down is secured to one stake, and another end of the tie-down is secured to the other stake.

14. The apparatus according to claim 12, wherein the tie-down is a woven polyester material.

15. A tree-staking kit comprising:
a plurality of rigid bodies, each rigid body defining an outer surface, an inner surface, and two opposed guides having apertures, each rigid body defining an oval shape and the two opposed guides protruding outwardly from a longitudinal periphery of each rigid body and being opposed by 180°, the inner surface having a conformal curvature and the outer surface having a conformal curvature radially offset from the conformal curvature of the inner surface, wherein the conformal curvature of the inner surfaces are sized to conform to an outer profile geometry of a tree and the rigid bodies are configured to partially encircle the tree when installed;
a plurality of tie-downs, each tie-down extending through one of the apertures of the two opposed guides, across and bearing against the outer surface, and through the other aperture of the opposed guide; and
a plurality of stakes,
wherein the tie-downs are configured to be secured to the stakes, the stakes are configured to be secured to a grounding surface for the tree.

16. The tree-staking kit according to claim 15, wherein the plurality of rigid bodies are stackable due to the conformal curvatures of the inner and outer surfaces.

17. The tree-staking kit according to claim 15, wherein the plurality of rigid bodies have the same conformal curvature of the inner surfaces.

18. The tree-staking kit according to claim 15, wherein the plurality of rigid bodies have different conformal curvature of the inner surfaces.

19. The tree-staking kit according to claim 15, wherein the plurality of rigid bodies define a predetermined functional pattern disposed on at least a portion of the outer surface.

\* \* \* \* \*